United States Patent [19]
Trompler et al.

[11] Patent Number: 5,402,627
[45] Date of Patent: Apr. 4, 1995

[54] LINE TRIMMER SUPPORT SKI

[76] Inventors: Brian K. Trompler, 9873 N. 16000 E. Rd., Grant Park, Ill. 60940; Donna Trompler, 11806 N. 12500 East Rd., Beecher, Ill. 60401

[21] Appl. No.: 175,527

[22] Filed: Dec. 30, 1993

[51] Int. Cl.⁶ .................... A01D 34/67; A01D 34/74
[52] U.S. Cl. ........................... 56/12.7; 56/17.2
[58] Field of Search ............ 56/12.1, 12.7, 16.7, 56/17.1, 17.2, 255, 17.5; 30/276, 347

[56] References Cited

U.S. PATENT DOCUMENTS

| | | | |
|---|---|---|---|
| 2,478,558 | 8/1949 | Beranek | 56/17.2 |
| 2,485,963 | 10/1949 | Godfrey | 30/276 X |
| 2,793,485 | 5/1957 | Emmons et al. | 56/17.5 X |
| 2,796,715 | 6/1957 | Meltzer | 56/17.2 |

FOREIGN PATENT DOCUMENTS

| | | | |
|---|---|---|---|
| 912031 | 7/1949 | Germany | 56/16.7 |
| 609563 | 9/1960 | Italy | 56/12.7 |
| 453920 | 9/1936 | United Kingdom | 30/276 |

Primary Examiner—David J. Bagnell

[57] ABSTRACT

A support ski for mounting to a line trimmer to support a trimmer in a spaced relationship to a ground surface. The ski is attachable to a line guard typically present on conventional trimmers and extends from a rearward position thereof to a forward position underneath the rotating line. The ski includes a pointed tip for permitting a forward sliding motion of the trimmer over the ground, and further includes upwardly curved side edges for allowing a lateral motion of the associated trimmer. An alternate embodiment of the present invention includes an adjustment means for selectively adjusting a relative height of the trimmer to the ground surface.

7 Claims, 4 Drawing Sheets

LINE TRIMMER SUPPORT SKI

BACKGROUND OF THE INVENTION

1. Field of the Invention

The present invention relates to trimmer supports and more particularly pertains to a line trimmer support ski for mounting to a line trimmer to support the trimmer in a spaced relationship to a ground surface.

2. Description of the Prior Art

The use of trimmer supports is known in the prior art. More specifically, trimmer supports heretofore devised and utilized for the purpose of supporting a trimmer are known to consist basically of familiar, expected and obvious structural configurations, notwithstanding the myriad of designs encompassed by the crowded prior art which have been developed for the fulfillment of countless objectives and requirements.

For example, an adjustable carriage for electric string trimmers is illustrated in U.S. Pat. No. 4,688,376 in which a light weight tubular frame has a central resilient housing-clamping mechanism adapted for holding a string trimmer. A plurality of castors are mounted to the tubular frame and quick detach forward/quick attach features enable the string trimmer to be used conveniently by itself or when desired. In addition, the carriage is provided with two height adjustment provisions and a convenient tilt adjustment for positioning the spring trimmer relative to the ground.

A weed and grass trimmer is described in U.S. Pat. No. 5,048,615 in which three wheels are used to support the weight of the trimmer. Cutting height is adjusted by way of an adjustable height arm and a secondary handle is provided to receive and translate an upward urging force into a tipping motion of the trimmer. The cutting head can be easily removed and a brush, snowblade, or blower can be installed thereto for accommodating a plurality of long care tasks.

Another patent of interest is U.S. Pat. No. 4,922,694 which discloses a wheeled support for a line trimmer that allows the trimmer to be used as a wheeled lawnmower or a wheeled edger. The lightweight, two wheeled support is adjustable for use with substantially all line trimmers.

Other known prior art trimmer supports are disclosed in U.S. Pat. No. 5,095,687, and U.S. Pat. No. 4,077,191.

While these devices fulfill their respective, particular objectives and requirements, the aforementioned patents do not disclose a line trimmer support ski for mounting to a line trimmer to support the trimmer in a spaced relationship to a ground surface in which the ski is attachable to the trimmer line guard and extends from a rearward position thereof to a forward position underneath the rotating line and which further includes a pointed tip for permitting a forward sliding motion and upwardly curved side edges for allowing a lateral motion of the associated trimmer. Furthermore, none of the known prior art trimmer supports teach or suggest a line trimmer support ski which still further includes an adjustment means for selectively adjusting a relative height of the trimmer to the ground surface therebeneath.

In these respects, the line trimmer support ski according to the present invention substantially departs from the conventional concepts and designs of the prior art, and in so doing provides an apparatus primarily developed for the purpose of mounting to a line trimmer to support the trimmer in a spaced relationship to a ground surface.

SUMMARY OF THE INVENTION

In view of the foregoing disadvantages inherent in the known types of trimmer supports now present in the prior art, the present invention provides a new line trimmer support ski construction wherein the same can be utilized for mounting to a line trimmer to support the trimmer in a spaced relationship to a ground surface. As such, the general purpose of the present invention, which will be described subsequently in greater detail, is to provide a new line trimmer support ski apparatus which has many of the advantages of the trimmer supports mentioned heretofore and many novel features that result in a line trimmer support ski which is not anticipated, rendered obvious, suggested, or even implied by any of the prior art trimmer supports, either alone or in any combination thereof.

To attain this, the present invention essentially comprises a support ski for mounting to a line trimmer to support a trimmer in a spaced relationship to a ground surface. The ski is attachable to a line guard typically present on conventional trimmers and extends from a rearward position thereof to a forward position underneath the rotating line. The ski includes a pointed tip for permitting a forward sliding motion of the trimmer over the ground, and further includes upwardly curved side edges for allowing a lateral motion of the associated trimmer. An alternate embodiment of the present invention includes an adjustment means for selectively adjusting a relative height of the trimmer to the ground surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new line trimmer support ski apparatus which has many of the advantages of the trimmer supports mentioned heretofore and many novel features that result in a line trimmer support ski which is not anticipated, rendered obvious, suggested, or even implied by any of the prior art trimmer supports, either alone or in any combination thereof.

It is another object of the present invention to provide a new line trimmer support ski which may be easily and efficiently manufactured and marketed.

It is a further object of the present invention to provide a new line trimmer support ski which is of a durable and reliable construction.

An even further object of the present invention is to provide a new line trimmer support ski which is susceptible of a low cost of manufacture with regard to both materials and labor, and which accordingly is then susceptible of low prices of sale to the consuming public, thereby making such line trimmer support skis economically available to the buying public.

Still yet another object of the present invention is to provide a new line trimmer support ski which provides in the apparatuses and methods of the prior art some of the advantages thereof, while simultaneously overcoming some of the disadvantages normally associated therewith.

Still another object of the present invention is to provide a new line trimmer support ski for mounting to a line trimmer to support the trimmer in a spaced relationship to a ground surface.

Yet another object of the present invention is to provide a new line trimmer support ski in which the ski is attachable to the trimmer line guard and extends from a rearward position thereof to a forward position underneath the rotating line.

Even still another object of the present invention is to provide a new line trimmer support ski which includes a pointed tip for permitting a forward sliding motion of the trimmer over the ground, and further includes upwardly curved side edges for allowing a lateral motion of the associated trimmer.

Even still yet another object of the present invention is to provide a new line trimmer support ski which further includes an adjustment means for selectively adjusting a relative height of the trimmer to the ground surface therebeneath.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
FIG. 1 is a perspective view of a first embodiment of a line trimmer support ski comprising the present invention.

With reference now to the drawings, and in particular to FIGS. 1-6 thereof, a first embodiment of a new line trimmer support ski embodying the principles and concepts of the present invention and generally designated by the reference numeral 10 will be described.

Figure 2:
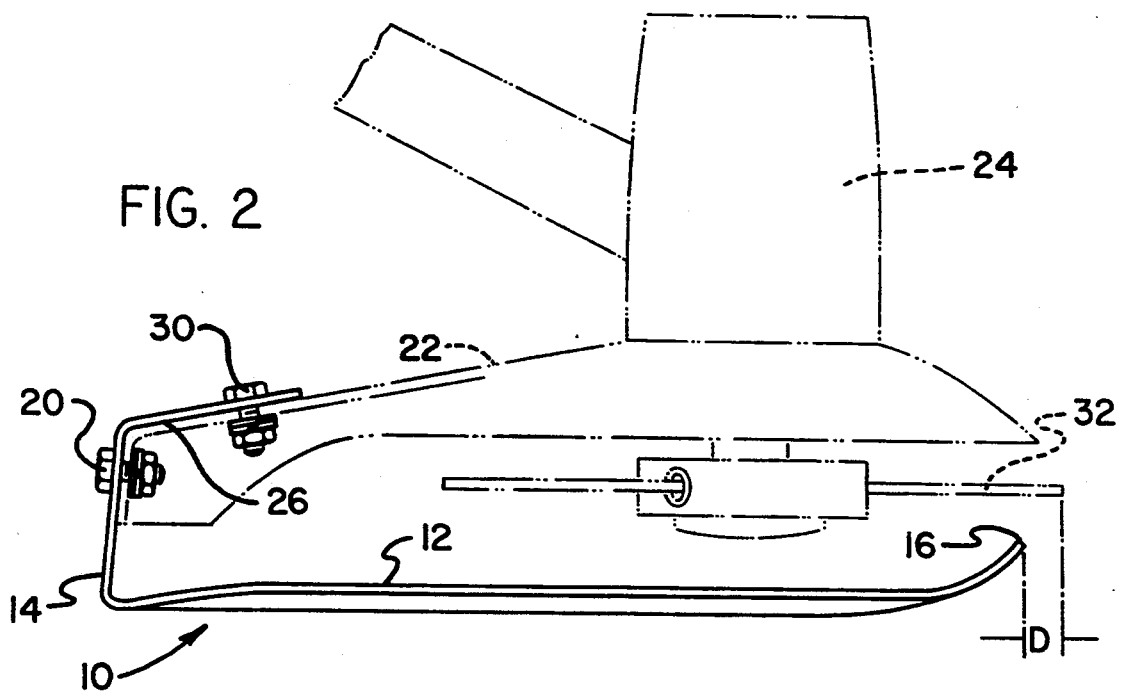
FIG. 2 is a side elevation view of the present invention detailing its attachment to a line trimmer.

From an overview standpoint, the line trimmer support ski 10 comprises an elongated ski 12 having a side member extending substantially upwardly from an end thereof and a pointed tip 16 formed at another end thereof. The side member 14 is shaped so as to define a side aperture 18 through which a side fastener 20 may be utilized to secure the side member to a rear of a line guard 22 of a conventional line trimmer 24, as best illustrated in FIG. 2. The side member angles and continues into an upper member 26 which lies substantially flat upon an upper surface of the guard 22. The upper member 26 similarly includes an upper aperture 28 through which an upper fastener 30 may engage a portion of the guard 22.

When installed upon the line trimmer 24, as illustrated in FIG. 2, the ski 12 extends beneath the rotating line 32 of the trimmer. The tip 16 of the ski 12, however, should not extend past an average reach of the line 32, thereby allowing the line to contact ground growth before the ski 12.

In use, the line trimmer support ski 10 may be easily installed to any conventional line trimmer 24 by simply fabricating two small holes within the guard 22 and installing the support ski 10 as shown in FIG. 2. The support 10 may be positioned upon a ground surface, whereby a substantial amount of weight of the line trimmer 24 is thereby supported. In addition, the line trimmer support ski 10 supports the line trimmer 24 at a uniform distance from the ground surface, thereby providing a more even cut to the grass and other growth being trimmed.

Figure 3:
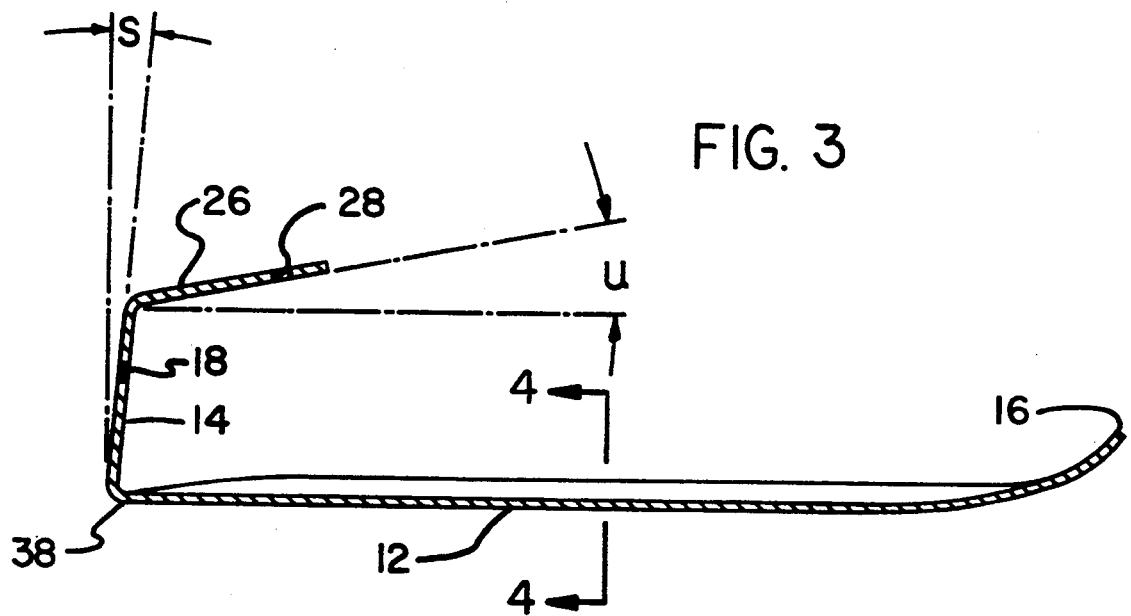
FIG. 3 is a cross-sectional view of the line trimmer support ski.

More specifically, it will be noted that the line trimmer support ski 10 comprises an elongated ski 12 which is integrally or otherwise connected to a substantially upwardly extending side member 14, as best illustrated in FIG. 3. The side member 14 extends upwardly from the ski 12 at an angle S of between 0 and 20 degrees away from the vertical. Preferably, the side member 14 extends upwardly from the ski 12 to define an angle S of approximately 5 degrees.

The side member 14 angles and continues to define an upper member 26 which extends substantially outwardly therefrom at an angle U of between 0 and 30 degrees from the horizontal. Preferably, the upper member 26 extends away from the side member 14 at an angle U of approximately 10 degrees from the horizontal.

Both the side member 14 and the upper member 26 are provided with apertures 18, 28 which allow fasteners 20, 30 to engage the guard 22, thereby securing the line trimmer support ski 10 to the associated line trimmer 24. It has been found that by providing the support ski 10 with both vertical and horizontal mounting areas, i.e. the side member 14 and the upper member 26 respectively, the ski is more securely supported by the guard. In addition, such mounting arrangement reduces fatigue and stress upon the outer portions of the guard 22 while simultaneously precluding a rotation of the support ski 10 about both horizontal and vertical axis.

Figure 4:
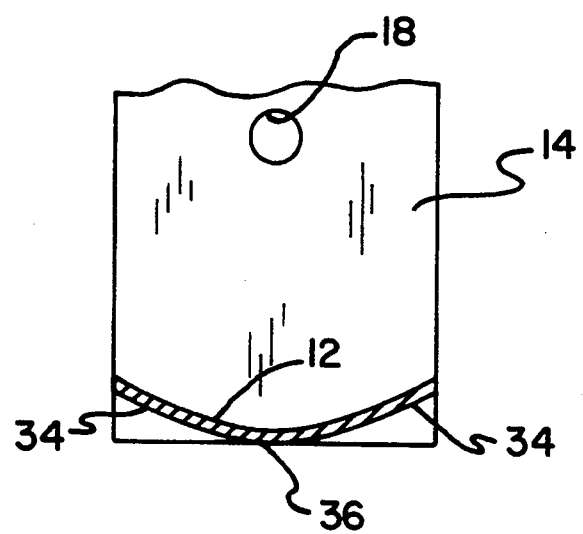
FIG. 4 is a cross-sectional view taken along line 4—4 of FIG. 3.

FIG. 4 is a cross-sectional view of the ski 12 and it can be seen from this Figure that the ski is shaped so as to define respectively opposed upwardly curved edges 34 which cooperatively define a downwardly positioned convex surface 36. The convex surface 36 is the portion of the ski 12 which rests upon the ground and, because of the upwardly curved edges 34, allows the ski 10 to laterally translate over rough or uneven terrain.

As best illustrated in FIG. 3, the upwardly curved edges 34 of the ski 12 taper off as they approach the side member 14 so as to define a flat area 38 which allows the ski 12 to resiliently pivot slightly with respect to the side member. Thus, the presence of the flat area 38 between the side member 14 and the ski 12 provides a resilient coupling between the ski and the side member and imparts a slight shock absorbing capability to the line trimmer support ski 10.

The ski 12, in addition to defining the upwardly curved edges 34, further includes an upwardly pointed tip 16 which permits a forward translation of the line trimmer support ski 10, and the associated line trimmer, over rough or uneven terrain. The tip 16 is integrally formed as a part of the ski 12 and extends upwardly therefrom to a point below the rotating line 32 so as to not interfere with the cutting capabilities of the line. In addition, and as best illustrated in FIG. 2, the tip 16 of the ski 12 should not extend past a reach of the line 32. Preferably, the tip 16 extends to a distance D behind the outermost reach of the line 32, wherein D is between approximately ¼ of an inch and 6 inches. Most preferably, the distance D behind the outermost reach of the line 32 to which the tip 16 extends is equal to approximately 2 inches.

Figure 5:
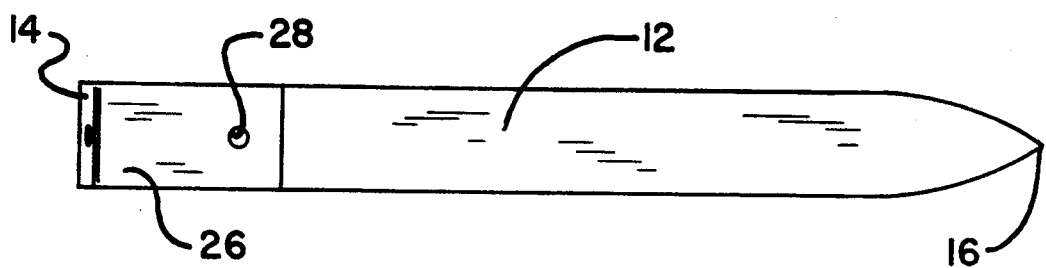
FIG. 5 is a top plan view of the first embodiment.
Figure 6:
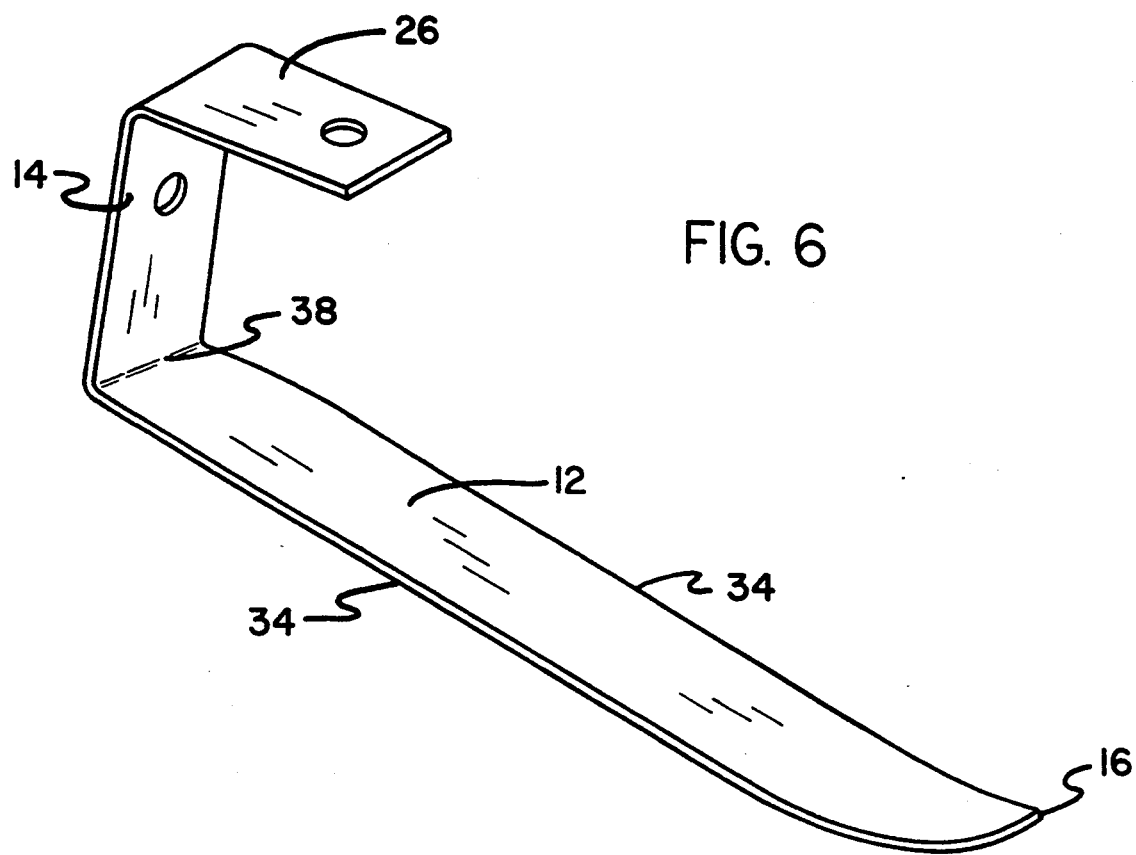
FIG. 6 is an enlarged perspective view of the present invention.

FIGS. 5 and 6 are a top plan view and a perspective view, respectively, of the line trimmer support ski 10 and it can be seen from these Figures that the support ski may be easily constructed of a single piece of metal such as steel, aluminum, or the like. In addition, it is within the intent in preview of the present invention to provide a line trimmer support ski 10 made of any conceivable material, including plastics and the like.

In use, the line trimmer support ski 10 may be easily installed to any conventional line trimmer 24 by simply fabricating two small holes within the guard 22 and installing the support ski 10 as shown in FIG. 2. The support 10 may be positioned upon a ground surface, whereby a substantial amount of weight of the line trimmer 24 is thereby supported. In addition, the line trimmer support ski 10 supports the line trimmer 24 at a uniform distance from the ground surface, thereby providing a more even cut to the grass and other growth being trimmed.

Figure 7:
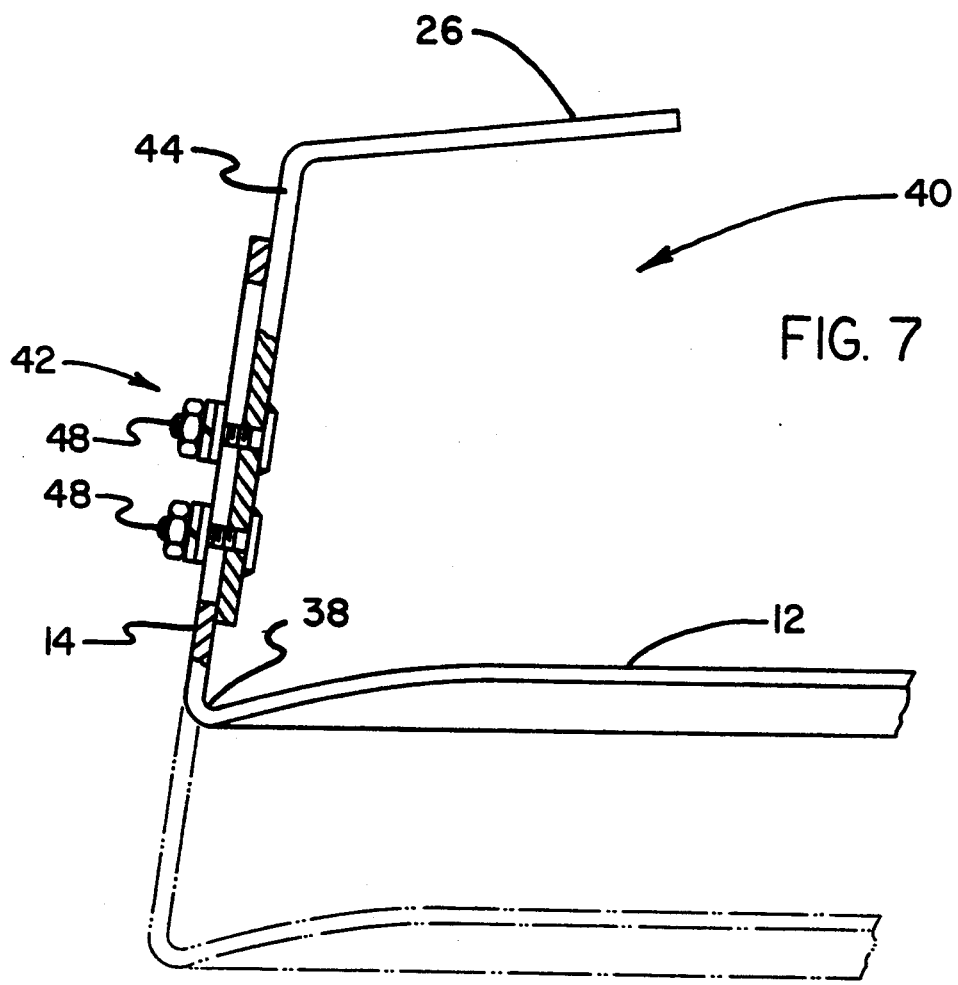
FIG. 7 is a side elevation view of a second embodiment of a line trimmer support ski comprising the present invention.
Figure 8:
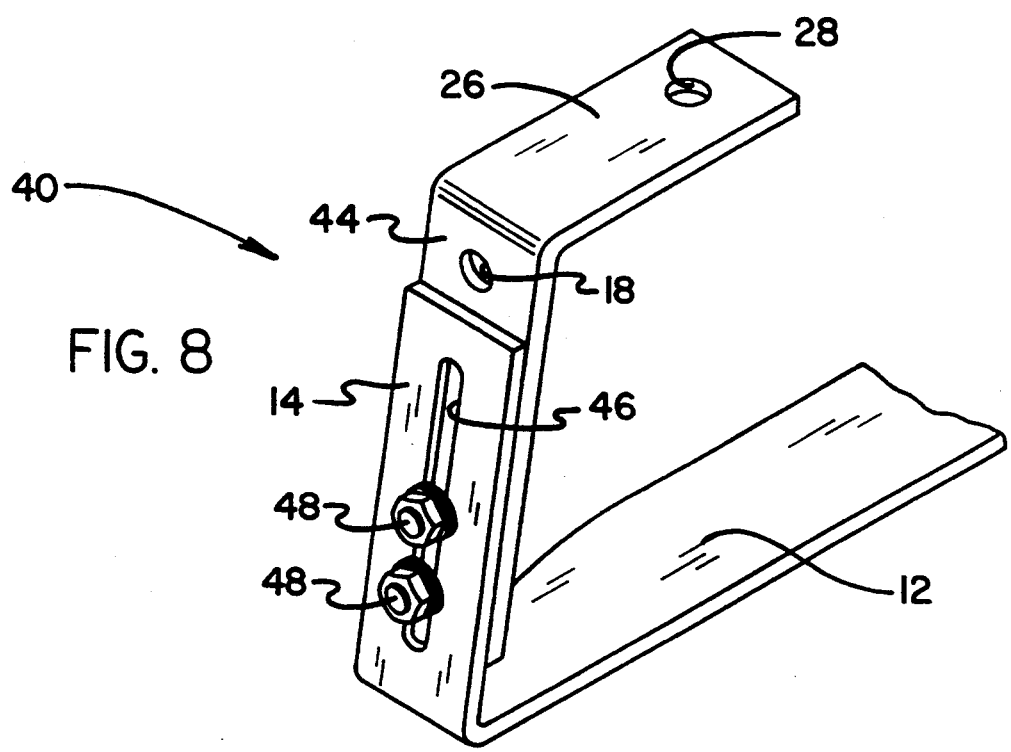
FIG. 8 is an enlarged perspective view of a portion of the second embodiment.

A second embodiment of the present invention as generally designated by the reference numeral 40 which comprises substantially all of the features of the foregoing embodiment 10 and which further comprises a height adjustment means 42 will now be described. As best shown in FIGS. 7-8 it can be shown that the height adjustment means 42 comprises an adjustable member 44 which, instead of the side member 14, is connected to the upper member 26. The adjustable member 44 is shaped so as to define the side aperture 18 through which the side fastener 20 may be positioned and secured to couple the adjustable member 44 and the upper member 26 to the guard 22 of the line trimmer 24 as described above.

The side member 14 of the second embodiment 40 includes an elongated aperture 46 which extends vertically and longitudinally therealong and the adjustable member includes a pair of adjustment fasteners 48 which are fixedly secured to thereto and are operable to extend through the elongated aperture 46, thereby to adjustably couple the adjustable member 44 to the side member 14. By this structure, the adjustment fasteners 48 may be loosened, the ski 12 may be adjustably positioned to a desired height or distance from the line trimmer 24, and the adjustment fasteners 48 retightened to secure such adjustment. The adjustment means 42 of the second embodiment 40 allows a user to selectively vary the cutting height provided by the line trimmer support ski 10 to accommodate various terrain and cutting requirements.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A line trimmer support ski for use with a line trimmer comprising:
a ski having first and second ends, said ski further having respectively opposed and upwardly curved sides, and a pointed tip at said second end thereof;
means for coupling said ski to said line trimmer, said means for coupling said ski to said line trimmer comprising a side member having a proximal end and a distal end and being coupled at said proximal end thereof to said first end of said ski and extending upwardly therefrom to define an angle S from tho vertical; an upper member; means for coupling said upper member to said distal end of said side member, said upper member being arranged to extend outwardly from said side member to define and angle U from the horizontal, said side member and said upper member each having an aperture therethrough, whereby fasteners can pass through said apertures to engage a line guard of said trimmer to mount said support ski thereto; and, a height adjustment means for adjusting a height between said ski and said line trimmer; wherein said upwardly curved sides taper off proximate to said first end of said ski to define a flat area which permits a substantially resilient pivoting motion of said ski with respect to said side member.

2. The line trimmer support ski of claim 1, wherein said side member has an elongated aperture extending longitudinally therethrough, and said height adjustment means comprises an adjustable member fixedly secured to said upper member; and means for selectively fastening said adjustable member to side member.

3. The line trimmer support ski of claim 2, wherein said means for selectively fastening said adjustable member to said side member comprises a pair of adjustment fasteners extending through both said adjustable member and said elongated aperture of said side member.

4. The line trimmer support ski of claim 3, wherein said angle S is between approximately 0 and 20 degrees, and said angle U is between approximately 0 and 30 degrees.

5. The line trimmer support ski of claim 4, wherein said angle S is substantially equal to approximately 5 degrees and said angle U is substantially equal to approximately 10 degrees.

6. A line trimmer support ski for use with a line trimmer comprising:

a ski having first and second ends, respectively opposed upwardly curved sides, and a pointed tip at said second end thereof;

a side member having a proximal end and a distal end, and an elongated aperture extending longitudinally therethrough, said side member being coupled to said first end of said ski and extending upwardly therefrom;

an upper member having an upper aperture extending therethrough;

an adjustable member having a side aperture extending therethrough and being coupled to said upper member; and, means for selectively fastening said side member to said adjustment member.

7. The line trimmer support ski of claim 6, wherein said means for selectively fastening said side member to said adjustable member comprises a pair of adjustment fasteners extending through both said adjustment member and said elongated aperture of said side member.

* * * * *